(12) United States Patent
Chen

(10) Patent No.: US 11,042,190 B1
(45) Date of Patent: Jun. 22, 2021

(54) SMART MOBILE DEVICE

(71) Applicant: HANNSTOUCH SOLUTION INCORPORATED, Tainan (TW)

(72) Inventor: Yen-Ting Chen, Tainan (TW)

(73) Assignee: Hannstouch Solution Incorporated, Tainan (TW)

( * ) Notice: Subject to any disclaimer, the term of this patent is extended or adjusted under 35 U.S.C. 154(b) by 0 days.

(21) Appl. No.: 16/909,392

(22) Filed: Jun. 23, 2020

(51) Int. Cl.
*G09G 5/00* (2006.01)
*G06F 1/16* (2006.01)
*A63F 13/2145* (2014.01)
*A63F 13/92* (2014.01)

(52) U.S. Cl.
CPC ........ *G06F 1/1641* (2013.01); *A63F 13/2145* (2014.09); *A63F 13/92* (2014.09); *G06F 1/1618* (2013.01); *G06F 1/1652* (2013.01); *A63F 2300/204* (2013.01)

(58) Field of Classification Search
CPC ........ G06F 1/16; G06F 1/1618; G06F 1/1641; G06F 1/1647; G06F 1/1652; A63F 13/92; A63F 13/2145; A63F 2300/204
See application file for complete search history.

(56) References Cited

U.S. PATENT DOCUMENTS

| | | | |
|---|---|---|---|
| 2005/0164752 A1* | 7/2005 | Lau | G06F 1/1666 455/575.3 |
| 2012/0218219 A1* | 8/2012 | Rappoport | H01L 27/3288 345/174 |
| 2014/0321072 A1* | 10/2014 | Cavallaro | H05K 1/028 361/749 |
| 2016/0073715 A1* | 3/2016 | Fayed | A41D 27/204 2/253 |
| 2020/0326754 A1* | 10/2020 | Kim | H04M 1/0264 |
| 2021/0081068 A1* | 3/2021 | Chen | G06F 3/0481 |

* cited by examiner

*Primary Examiner* — Joe H Cheng
(74) *Attorney, Agent, or Firm* — Allen, Dyer, Doppelt + Gilchrist, PA

(57) ABSTRACT

A smart mobile device is disclosed. The proposed smart mobile device includes a foldable screen having a front and a back, and at least one lens configured on the back, wherein the foldable screen has a surrounding perimeter, and the surrounding perimeter has at least one cut area such that when the foldable screen is folded in a specific way, the at least one lens is revealed from the at least one cut area or surrounded by a plurality of the cut areas.

16 Claims, 13 Drawing Sheets

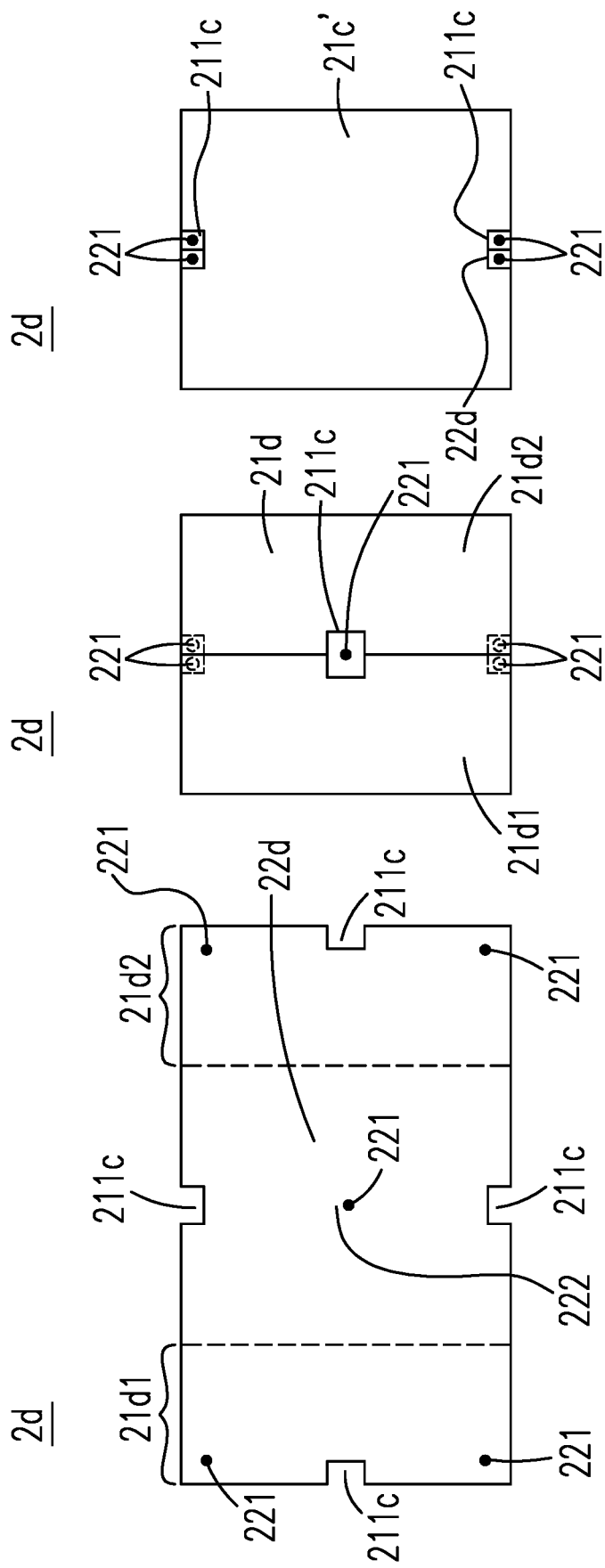

SMART MOBILE DEVICE

FIELD OF THE INVENTION

The present invention relates to a smart mobile device, in particular to an all-screen-flat-panel smart mobile device.

BACKGROUND OF THE INVENTION

Currently, the front lens of an all screen smart mobile device is difficult to hide, the mobile device with a big screen is hard to store, and it is difficult to have room for the development of the design patents of the multi-fold and folded in half rectangular foldable mobile devices.

The front lens will destroy the aesthetic design of the all screen display, decrease the display area and increase the difficulty of cutting the optical substrate. Also, how to satisfy the front lens shooting has become a technological challenge. Using the folding method, the storage of the ultra-wide-all-screen display can be significantly improved. Given consideration to the aesthetic aspects and the requirements of the front lens, a novel design must be provided.

SUMMARY OF THE INVENTION

It is the aim of the present invention to provide a square-shaped foldable mobile device with a notch/cut edge (rounded or flat) located at each of the four corners, the front is an all screen, a lens is configured on each of the four corners and in the center of the back. A flash, a support and/or all kinds of other auxiliary function settings can be added to the back. When the four corners are folded outward for 180°, the area is greatly reduced, and the all screen becomes a double-sided display. The lens will be revealed from the center of the back so as to solve the problem of hiding the front lens of the all screen. The four corners can be gathered up for only a portion such that the mobile device can be assisted to stand up, and to provide a panorama, a multi-screen monitoring function, or a virtual joystick.

It is another objective of the present invention to provide a rectangular-shaped foldable mobile device by using cut edges (rounded or flat)/notches to reveal a rear lens when the two sides of the device are folded backward, and the original rear lens configured on the back can be used as a front lens (including a screen and a lens). After the folding, the rear lens on the back is surrounded by or revealed from the respective cut edges and/or notches, this area around the lens is quite small, and the cut edges/notches will not influence the aesthetics of the all screen when the all screen is unfolded. When the all screen is folded, the front display area is quite complete, the rear lens on the back can be used as the front lens to take selfies with a large area display around this lens so as to achieve the effect of sharing the front lens and the rear lens, and to decrease the costs of the lenses configuration. After the mobile device is folded, both the upper part and the lower part can be used to reveal the lenses through the cut edges such that the mobile device can be configured with plural lenses (the cut edge can be enlarged to reveal the plural lenses/optical device in a single exposed area), and to achieve the shooting effect of digital depth of field.

In accordance with the first aspect of the present invention, a smart mobile device comprises a square-shaped foldable screen having a first front, and a back with a center, and at least one lens configured on the center, wherein the square-shaped foldable screen has four corners, each corner has a cut edge or a notch, and when the four corners of the first front are all folded to the back for 180°, the at least one lens configured on the center is surrounded among the cut edges or the notches.

In accordance with the second aspect of the present invention, a smart mobile device comprises a rectangular-shaped foldable screen having a first front and a back, and at least one lens configured on the back, wherein the rectangular-shaped foldable screen has four sides and four corners, at least one of the four sides has a notch and/or at least one of the four corners has a cut edge, the first front is an all screen, the four sides have two longer ones and two shorter ones, the rectangular-shaped foldable screen has a second front when the two shorter sides are folded from the first front to the back for 180°, the area of the second front is ½ of that of the first front, the second front has a rectangular shape and results in that the all screen becomes a double-sided display, and the at least one lens is near or surrounded by the respective cut edge and/or notch.

In accordance with the third aspect of the present invention, a smart mobile device comprises a foldable screen having a front and a back, and at least one lens configured on the back, wherein the foldable screen has a surrounding perimeter, and the surrounding perimeter has at least one cut area such that when the foldable screen is folded in a specific way, the at least one lens is revealed from the at least one cut area or surrounded by a plurality of the cut areas.

BRIEF DESCRIPTION OF THE DRAWINGS

Other objectives, advantages and the efficacy of the present invention will be described in detail below taken from the preferred embodiments with reference to the accompanying drawings, in which:

FIG. 13(a) is a schematic diagram of a back of a smart mobile device according to the ninth preferred embodiment of the present invention, wherein each of four lateral sides of a rectangular-shaped foldable screen has a notch, and each of four corners and a center of the back has a lens.

FIG. 13(b) is a schematic diagram of a smart mobile device as shown in FIG. 13(a) showing when two shorter sides of the rectangular-shaped foldable screen are folded to the back for 180°, a fifth lens is revealed from the center of the back, and a first to a fourth lenses are revealed from the front.

FIG. 13(c) is a schematic diagram of a smart mobile device as shown in FIG. 13(a) showing when two shorter sides of the rectangular-shaped foldable screen are folded to the back for 180°, a first to a fourth lenses are revealed from the front.

DETAILED DESCRIPTION OF THE PREFERRED EMBODIMENT

The present invention will now be described more specifically with reference to the following embodiments. It is to be noted that the following descriptions of the preferred embodiments of this invention are presented herein for purposes of illustration and description only; they are not intended to be exhaustive or to be limited to the precise form disclosed.

Figure 1A:
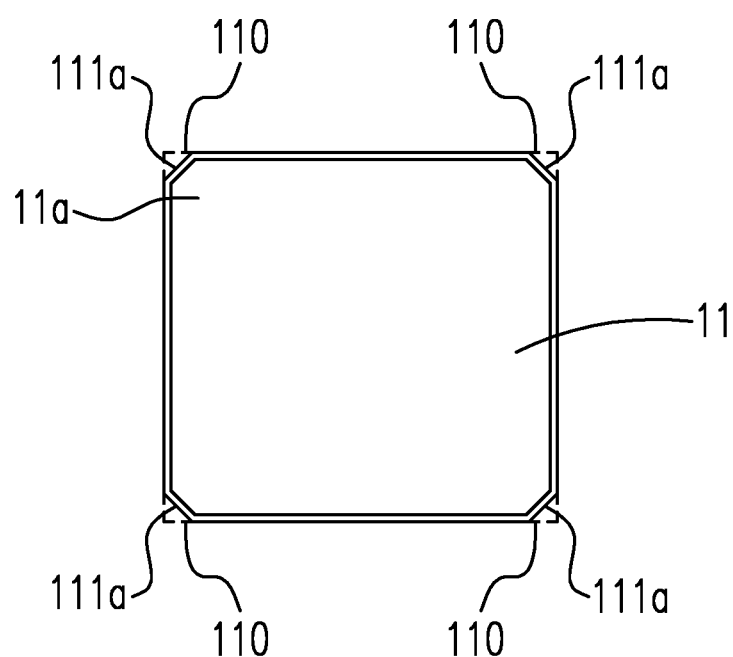
FIG. 1(a) is a schematic diagram of a front of a smart mobile device according to the first preferred embodiment of the present invention.

FIG. 1(a) shows a schematic diagram of a front of a smart mobile device according to the first preferred embodiment of the present invention. In FIG. 1(a), the smart mobile device 1a (see FIG. 4(a)) is a foldable mobile device 1a having a square 11, each of four corners 110 of the square 11 has a small cut edge 111a, the foldable mobile device 1a includes a first front 11a, which is an all screen 11a, the small cut edge 111a is flat, wherein the square 11 has a maximum area of the same sum of side lengths, and has the advantage of having a maximum display area when the space is relatively limited.

Figure 1B:
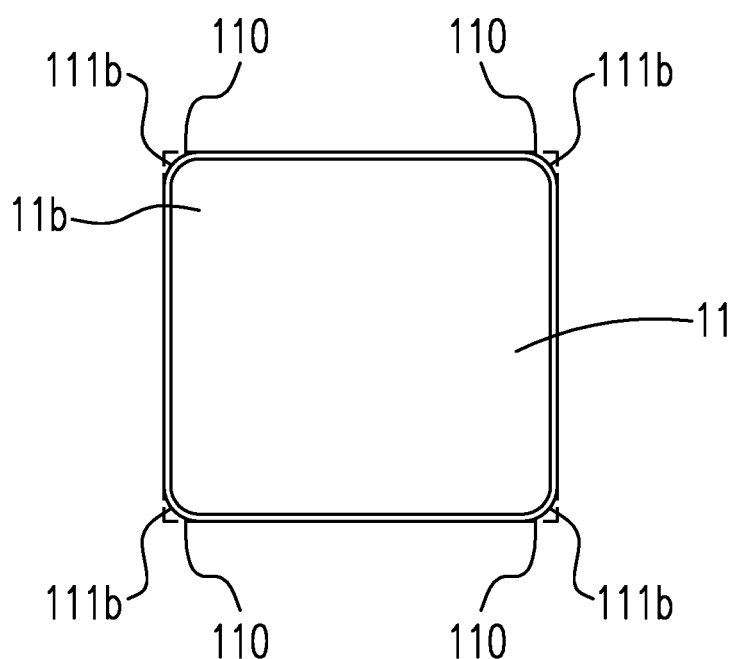
FIG. 1(b) is a schematic diagram of a front of a smart mobile device according to the second preferred embodiment of the present invention.

FIG. 1(b) shows a schematic diagram of a front of a smart mobile device according to the second preferred embodiment of the present invention. In FIG. 1(b), the smart mobile device 1b (see FIG. 4(b)) is a foldable mobile device 1b having a square 11, each of four corners 110 of the square 11 has a small cut edge 111b, the foldable mobile device 1b includes a first front 11b, which is an all screen 11b, the small cut edge 111b is rounded.

Figure 2A:
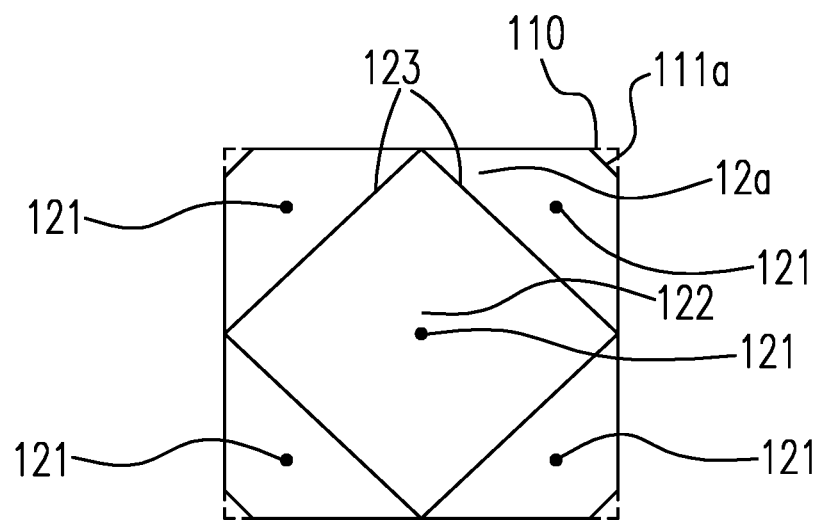
FIG. 2(a) is a schematic diagram of a back of a smart mobile device according to the first preferred embodiment of the present invention.

FIG. 2(a) shows a schematic diagram of a back of a smart mobile device according to the first preferred embodiment of the present invention. In FIG. 2(a), it shows a back 12a of the smart mobile device 1a as shown in FIG. 1(a). In FIG. 2(a), except for showing the four corners 110 of the square 11 has a small cut edge 111a, it also shows the back 12a has 5 lenses (camera lens) 121 located at a center 122 and places near to four cut edges 111a, and four fold lines 123 disposed within the case of the smart mobile device forming a square region on the back 12a of the smart mobile device 1a.

Figure 2B:
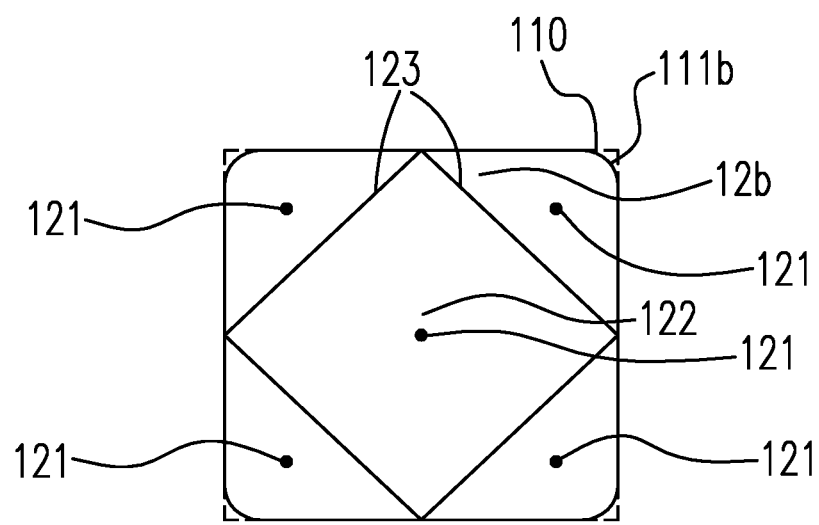
FIG. 2(b) is a schematic diagram of a back of a smart mobile device according to the second preferred embodiment of the present invention.

FIG. 2(b) shows a schematic diagram of a back of a smart mobile device according to the second preferred embodiment of the present invention. In FIG. 2(b), it shows a back 12b of the smart mobile device 1b as shown in FIG. 1(b). In FIG. 2(b), except for showing the four corners 110 of the square 11 has a small cut edge 111b, it also shows the back 12b has 5 lenses (camera lens) 121 located at a center 122 and places near to four cut edges 111b, and four fold lines 123 disposed within the case of the smart mobile device forming a square region on the back 12b of the smart mobile device 1b. The five lenses 121 in FIG. 2(a) or FIG. 2(b) are used to carry out the effect of the digital fitting of the depth of field such that the smart mobile device 1a/1b has the functions of SLR-Like cameras. The foldable-all-screen smart mobile devices 1a/1b are shown in FIGS. 1(a) to 2(b), when the four corners 110 of the square 11 are folded from the first front 11a/11b to the back 12a/12b, and only gathered up a portion to be used to help the smart mobile devices 1a/1b to stand up (see FIG. 5(a) or FIG. 5(b)), or to provide a multi-screen monitoring (see FIG. 5(a) or FIG. 5(b)), a panorama shooting (see FIG. 6(a) or 6(b)), or a virtual joystick (see FIG. 8(a) or 8(b)). The foldable screen 11a/11b has a surrounding perimeter (e.g., it is formed by the four sides of the square 11 as shown in FIG. 1(a) to FIG. 2(b)), and the surrounding perimeter has at least one cutting area 111a/111b such that when the foldable screen 11a/11b is folded in a specific way, the at least one lens 121 is revealed from the at least one cutting area 111a/111b or surrounded by a plurality of the cut areas 111a/111b (as shown in FIG. 4(a)/FIG. 4(b)).

Figure 3A:
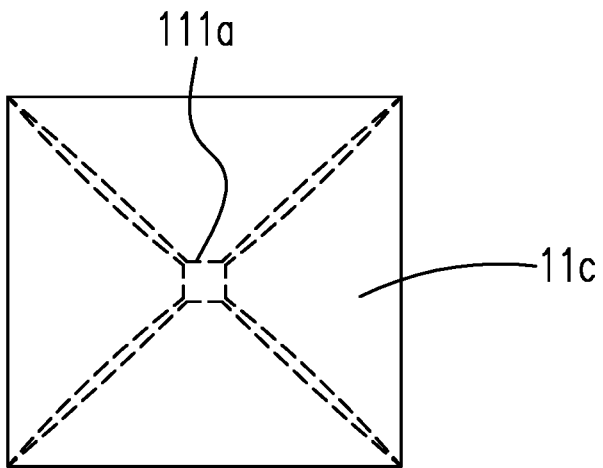
FIG. 3(a) is a schematic diagram of a smart mobile device according to the first preferred embodiment of the present invention showing when the four corners of a square-shaped foldable screen are all folded to the back for 180°, a first front of the square-shaped foldable screen is shrunk to a second front.
Figure 3B:
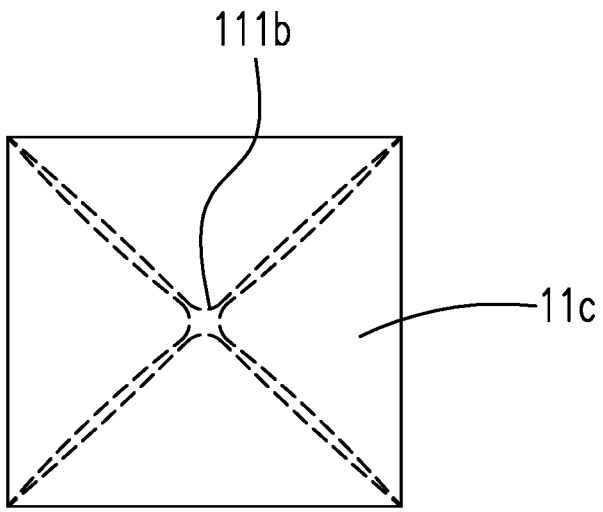
FIG. 3(b) is a schematic diagram of a smart mobile device according to the second preferred embodiment of the present invention showing when the four corners of a square-shaped foldable screen are all folded to the back for 180°, a first front of the square-shaped foldable screen is shrunk to a second front.

FIG. 3(a) and FIG. 3(b) respectively display a schematic diagram of a smart mobile device according to the first and the second preferred embodiments of the present invention showing when the four corners of a square-shaped foldable screen are all folded along the corresponding fold lines 123 as shown in FIGS. 2(a) and 2(b) to the center 122 of the back 12a/12b for 180°, a first front of the square-shaped foldable screen is shrunk to a second front. FIG. 3(a) and FIG. 3(b) respectively show the four corners 110 near to the places of the four small cut edges 111a/111b of the smart mobile device 1a/1b (as shown in FIGS. 4(a) and 4(b)) are all folded from the first front 11a/11b to the back 12a/12b for 180°, the first front 11a/11b is shrunk to a second front 11c, the second front 11c is still a square, and the area of the second front 11c is shrunk to ½ of that of the first front 11a/11b. The dotted lines in FIG. 3(a) and FIG. 3(b) respectively show the portion folded to the back thereof.

Figure 4A:
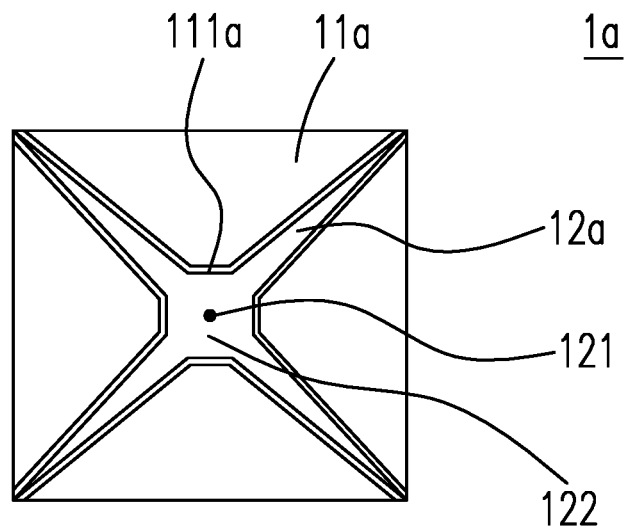
FIG. 4(a) is a schematic diagram of a smart mobile device according to the first preferred embodiment of the present invention showing when the four corners of a square-shaped foldable screen are all folded to the back for 180°, a lens configured on the center of the back is revealed.
Figure 4B:
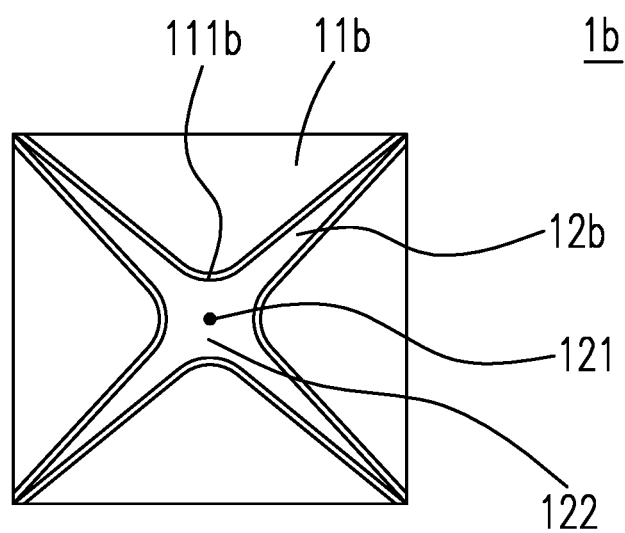
FIG. 4(b) is a schematic diagram of a smart mobile device according to the second preferred embodiment of the present invention showing when the four corners of a square-shaped foldable screen are all folded to the back for 180°, a lens configured on the center of the back is revealed.

FIG. 4(a) displays a schematic diagram of a smart mobile device according to the first preferred embodiment of the present invention showing when the four corners of a square-shaped foldable screen are all folded to the back for 180°, a lens configured on the center of the back is revealed. FIG. 4(a) displays the four corners 110 near to the four small cut edges 111a of the smart mobile device 1a are all folded from the first front 11a to the back 12a for 180° to reveal the lens 121 configured on the center 122 as a front lens 121 to solve the front lens hiding problem of the conventional all screen. The design of double-sided display after the folding can have various applications, which are provided for the user's discretion. Due to the screen area being quite large, the influence of the visibility caused by the small cut edge/the small notch 111a will be relatively small, and the user can take selfies through the lens 121 configured on the center 122 conveniently.

FIG. 4(b) displays a schematic diagram of a smart mobile device according to the second preferred embodiment of the present invention showing when the four corners of a square-shaped foldable screen are all folded to the back for 180°, a lens configured on the center of the back is revealed. FIG. 4(b) displays the four corners 110 near to the four small cut edges 111b of the smart mobile device 1b are all folded from the first front 11b to the back 12b for 180° to reveal the lens 121 configured on the center 122.

Figure 5A:
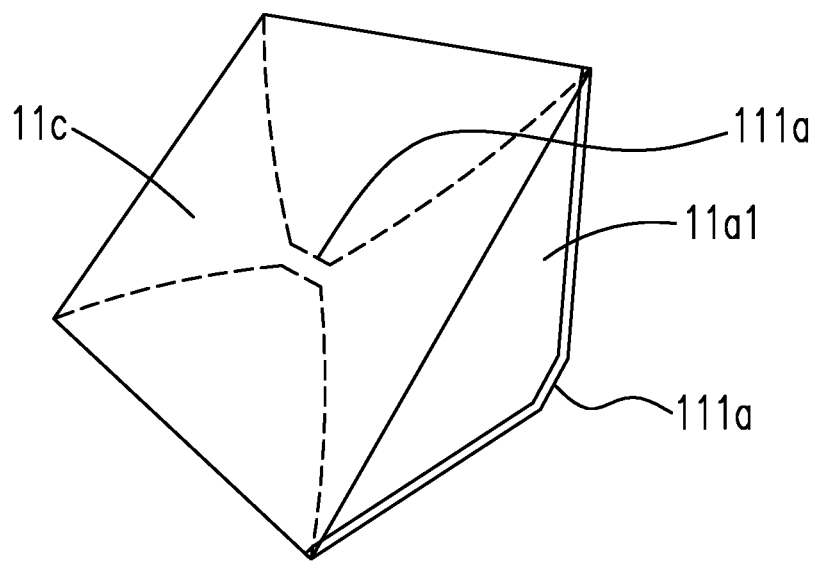
FIG. 5(a) is a schematic diagram of a smart mobile device according to the first preferred embodiment of the present invention showing when the two corners nonadjacent and opposite to each other of the four corners of a square-shaped foldable screen are folded to the back for 90° to help the smart mobile device to stand up.

FIG. 5(a) displays a schematic diagram of a smart mobile device according to the first preferred embodiment of the present invention showing when the two corners nonadjacent and opposite to each other of the four corners of a square-shaped foldable screen are folded to the back for 90° to help the smart mobile device to stand up. FIG. 5(a) displays when the two corners 110 nonadjacent to each other and near to the two small cut edges 111a of the smart mobile device 1a (as shown in FIG. 4(a)) are all folded from the first front 11a to the back 12a for 90° to help the smart mobile device to stand up, and there are two lateral screens 11a1 (close to the second front 11c and respectively located on the two corners opposite to each other) and the second front 11c, in total three screens. If the three lenses on the back are used, each lens monitors a place, thus three respective places can be monitored simultaneously, and a multi-screen monitoring function can be supported.

Figure 5B:
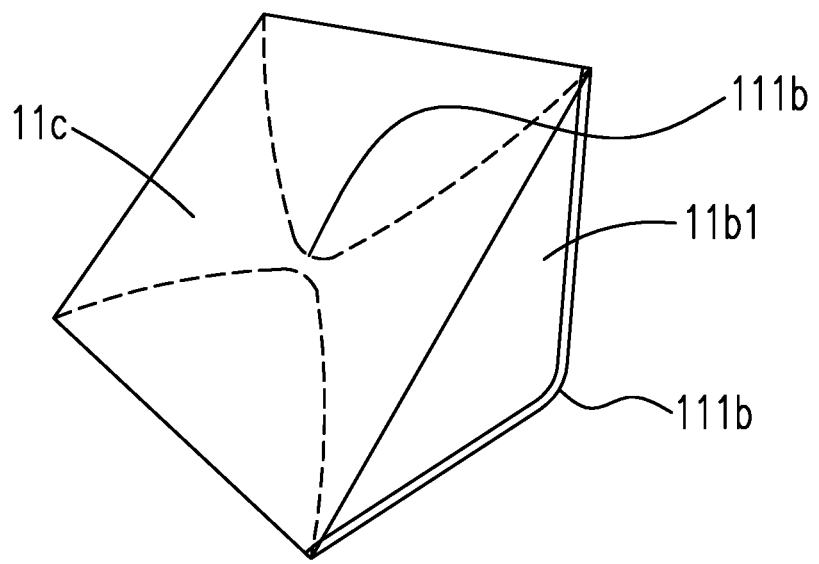
FIG. 5(b) is a schematic diagram of a smart mobile device according to the second preferred embodiment of the present invention showing when the two corners nonadjacent and opposite to each other of the four corners of a square-shaped foldable screen are folded to the back for 90° to help the smart mobile device to stand up.

FIG. 5(b) displays a schematic diagram of a smart mobile device according to the second preferred embodiment of the present invention showing when the two corners nonadjacent and opposite to each other of the four corners of a square-shaped foldable screen are folded to the back for 90° to help the smart mobile device to stand up. FIG. 5(b) displays when the two corners 110 nonadjacent to each other and near to the two small cut edges 111b of the smart mobile device 1b (as shown in FIG. 4(b)) are all folded from the first front 11b to the back 12b for 90° to help the smart mobile device to stand up, and there are two lateral screens 11b1 (close to the second front 11c and respectively located on the two corners opposite to each other) and the second front 11c, in total three screens. If the three lenses on the back are used, each lens monitors a place, thus three respective places can be monitored simultaneously, and a multi-screen monitoring function can be supported. The dotted lines in FIG. 5(a) and FIG. 5(b) respectively show the portion folded to the back thereof.

Figure 6A:
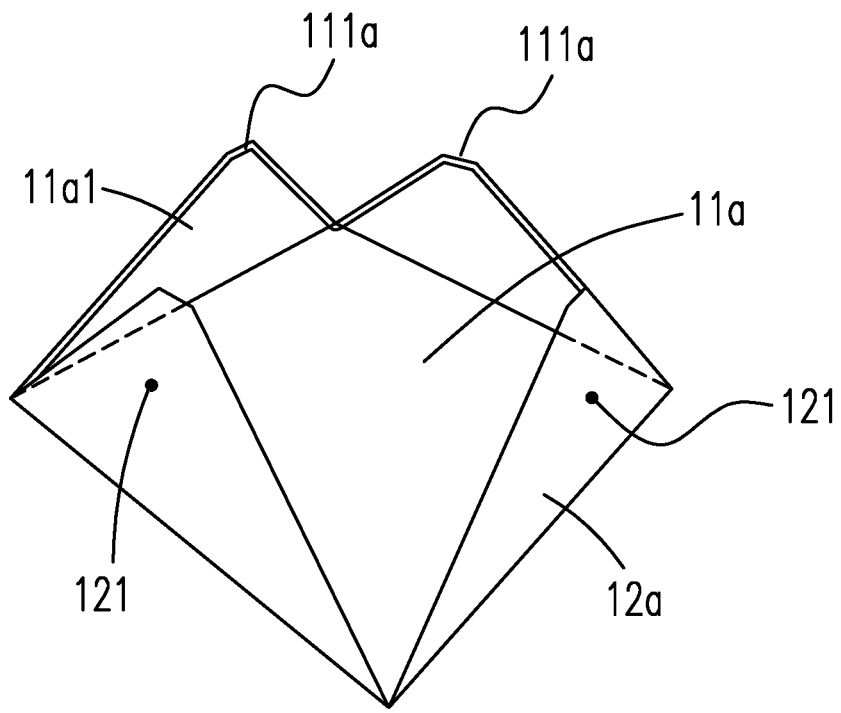
FIG. 6(a) is a schematic diagram of a smart mobile device according to the first preferred embodiment of the present invention showing when the four corners of a square-shaped foldable screen are all folded to the front for 90°, the four lenses are used to shoot a 360° panorama simultaneously.

FIG. 6(a) displays a schematic diagram of a smart mobile device according to the first preferred embodiment of the present invention showing when the four corners of a square-shaped foldable screen are all folded to the front for 90°, the four lenses are used to shoot a 360° panorama shooting simultaneously. FIG. 6(a) displays when the four corners 110 near to the four small cut edges 111a of the smart mobile device 1a (as shown in FIG. 4(a)) are all folded from the back 12a to the front 11a for 90°, the four lenses 121 near to the four small cut edges 111a are used to shoot a 360° panorama, and a panoramic photography can be accomplished by pushing one key and can be displayed on the screen synchronously via software operations.

Figure 6B:
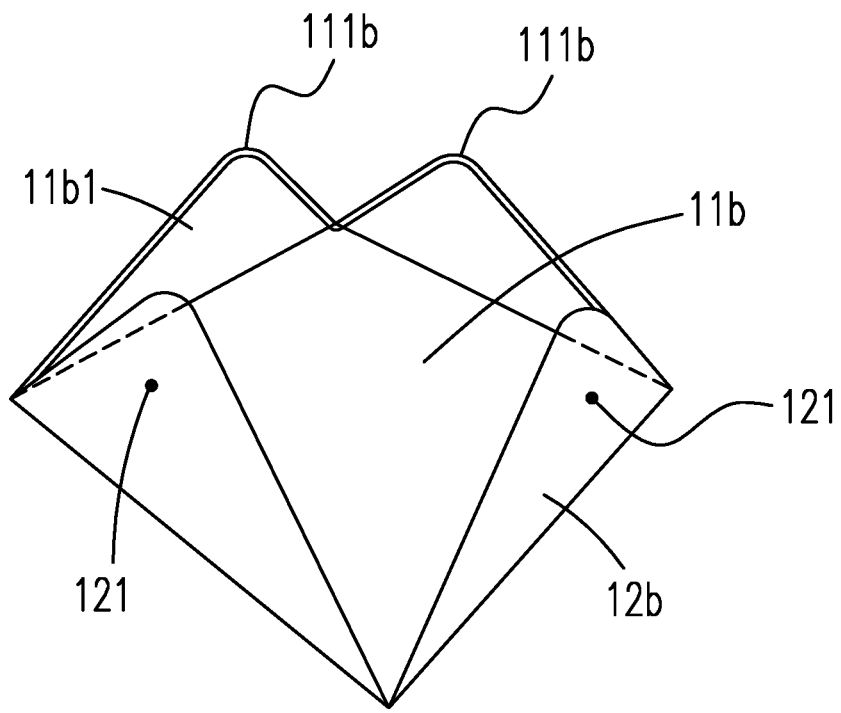
FIG. 6(b) is a schematic diagram of a smart mobile device according to the second preferred embodiment of the present invention showing when the four corners of a square-shaped foldable screen are all folded to the front for 90°, the four lenses are used to shoot a 360° panorama simultaneously.

FIG. 6(b) shows a schematic diagram of a smart mobile device according to the second preferred embodiment of the present invention showing when the four corners of a square-shaped foldable screen are all folded to the front for 90°, the four lenses are used to shoot a 360° panorama simultaneously. FIG. 6(b) displays when the four corners 110 near to the four small cut edges 111b of the smart mobile device 1b (as shown in FIG. 4(b)) are all folded from the back 12b to the front 11b for 90°, the four lenses 121 near to the four small cut edges 111b are used to shoot a 360° panorama.

Figure 7A:
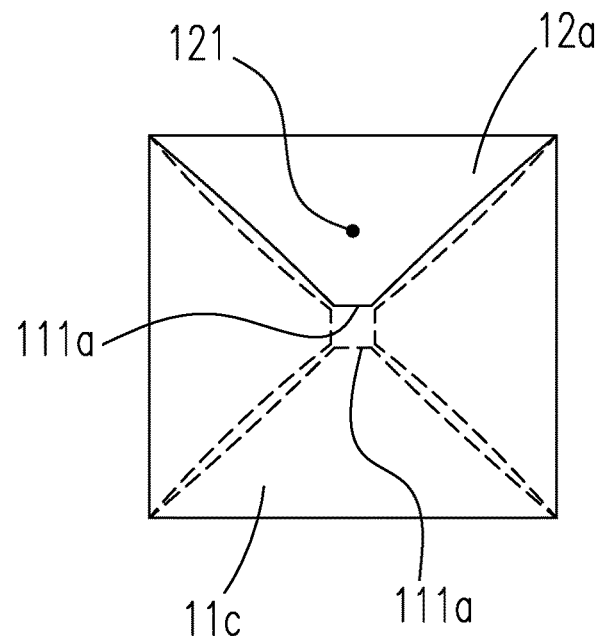
FIG. 7(a) is a schematic diagram of a smart mobile device according to the first preferred embodiment of the present invention showing when one corner of a square-shaped foldable screen is folded forward to the front for 180°, a selfie function can be carried out.

FIG. 7(a) shows a schematic diagram of a smart mobile device according to the first preferred embodiment of the present invention showing when one corner of a square-shaped foldable screen is folded forward to the front for 180°, a selfie function can be carried out. FIG. 7(a) displays when one of the four corners 110 near to the corresponding small cut edge 111a of the smart mobile device 1a (as shown in FIG. 4(a)) is folded from the back 12a to the front 11a for 180°, a selfie function can be carried out. The dotted lines in FIG. 7(a) show the portion folded to the back thereof.

Figure 7B:
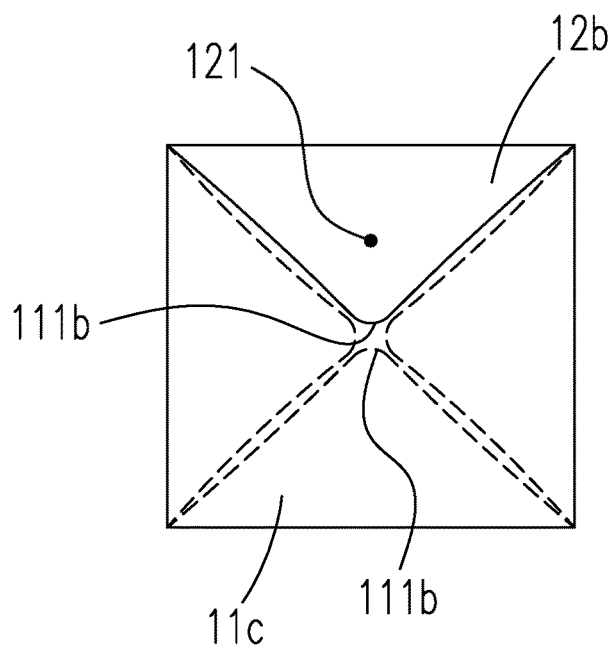
FIG. 7(b) is a schematic diagram of a smart mobile device according to the second preferred embodiment of the present invention showing when one corner of a square-shaped foldable screen is folded forward to the front for 180°, a selfie function can be carried out.

FIG. 7(b) shows a schematic diagram of a smart mobile device according to the second preferred embodiment of the present invention showing when one corner of a square-shaped foldable screen is folded forward to the front for 180°, a selfie function can be carried out. FIG. 7(b) displays when one of the four corners 110 near to the corresponding small cut edge 111b of the smart mobile device 1b (as shown in FIG. 4(b)) is folded from the back 12b to the front 11b for 180°, a selfie function can be carried out. The dotted lines in FIG. 7(b) show the portion folded to the back thereof. As shown in FIG. 7(a) or FIG. 7(b), when one corner 110 or plural corners 110 of the four corners 110 is/are folded from the back 12a/12b to the front 11a/11b for 180°, at least one lens 121 is revealed to carry out a selfie function. When plural lenses 121 are folded forward, a frontal shot with digital depth of field effect can be carried out. How many lenses 121 are required and what is the screen-to-body ratio are decided by the user.

Figure 8A:
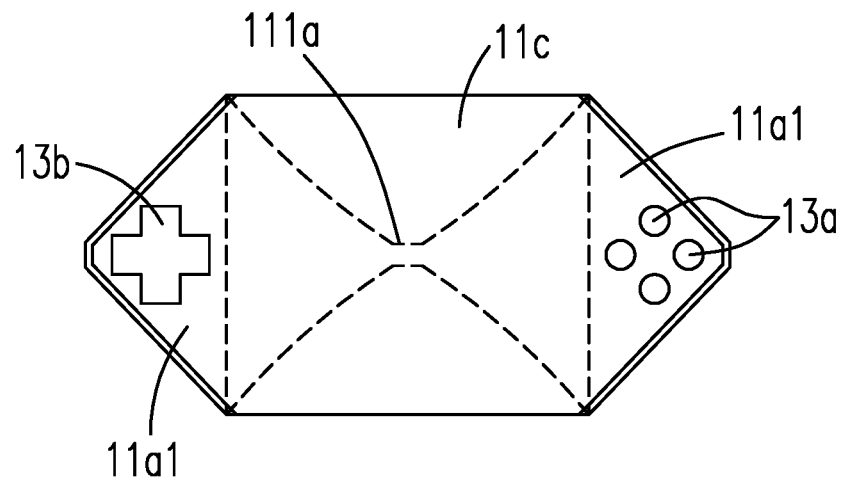
FIG. 8(a) is a schematic diagram of a smart mobile device according to the first preferred embodiment of the present invention showing when the two corners of a square-shaped foldable screen are folded backward and the square-shaped foldable screen is used as a handheld game console, virtual keys are configured on lateral sides of the two unfolded corners.
Figure 8B:
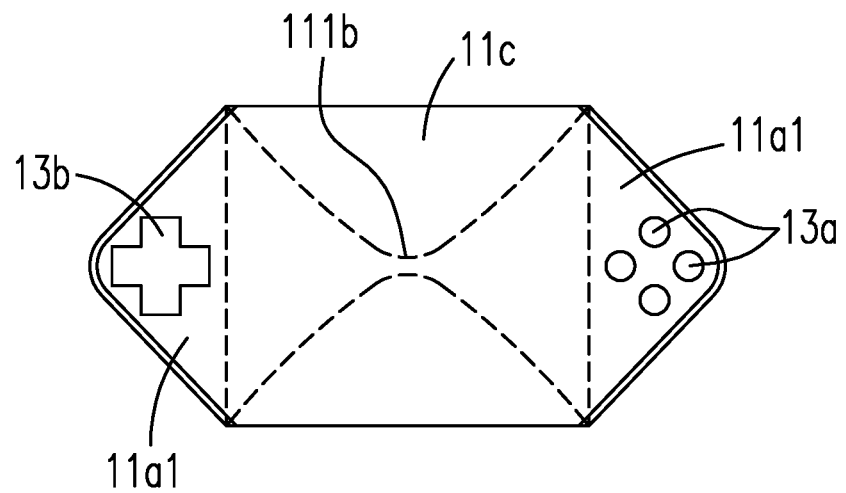
FIG. 8(b) is a schematic diagram of a smart mobile device according to the second preferred embodiment of the present invention showing when the two corners of a square-shaped foldable screen are folded backward and the square-shaped foldable screen is used as a handheld game console, virtual keys are configured on lateral sides of the two unfolded corners.

FIGS. 8(a) and 8(b) respectively show a schematic diagram of a smart mobile device according to the first and the second preferred embodiments of the present invention, showing when the two corners of a square-shaped foldable screen are folded backward and the square-shaped foldable screen is used as a handheld game console, virtual keys are configured on lateral sides of the two unfolded corners. FIGS. 8(a) and 8(b) respectively display when the two corners 110 nonadjacent and opposite to each other and near to the two small cut edges 111a or 111b of the smart mobile device 1a (as shown in FIG. 4(a)) or 1b (as shown in FIG. 4(b)) are all folded from the first front 11a or 11b to the back 12a or 12b for 180° and the smart mobile device 1a or 1b is used as a handheld game console 1a or 1b. The dotted lines in FIGS. 8(a) and 8(b) show the portion folded to the back thereof. Virtual keys 13a/13b are configured on lateral screens 11a1 of the two corners not folded from the second front 11c outward such that the display screen of the handheld game console 1a or 1b will not be influenced so as to provide the user with the most comfortable game experience.

The above-mentioned square-shaped-four-fold all screen mobile device has novel appearance and multiple functions, can be applied to various rigid device and flexible device (if it is a flexible device, the appearance of which will be even more aesthetic), and solve all aspects of the conventional problems of hiding the front lens of the all screen smart mobile device and the storage of large area device.

Figure 9A:
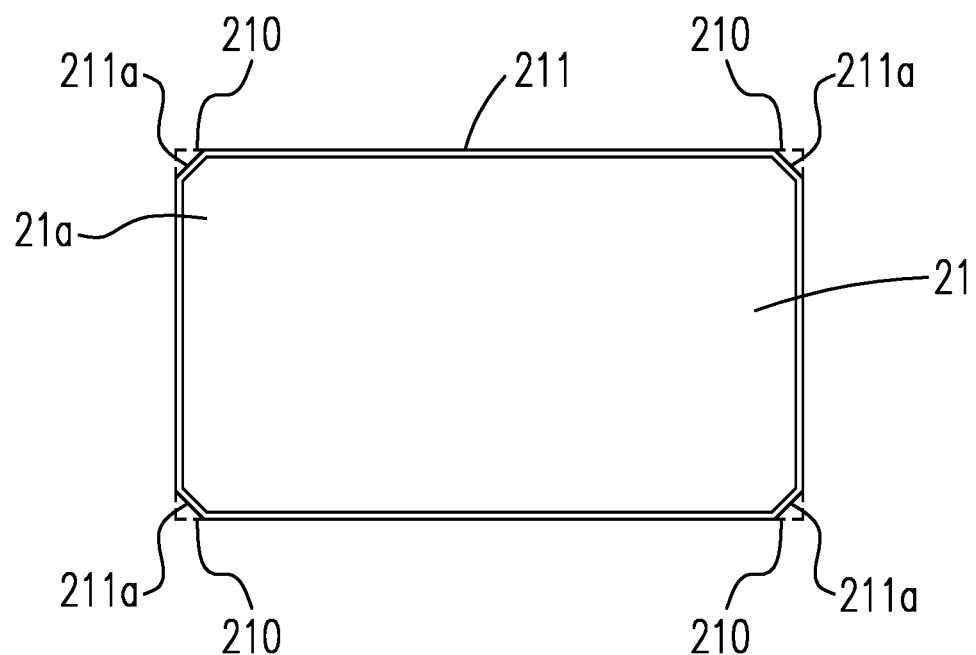
FIG. 9(a) is a schematic diagram of a front of a smart mobile device according to the third preferred embodiment of the present invention.
Figure 12A:
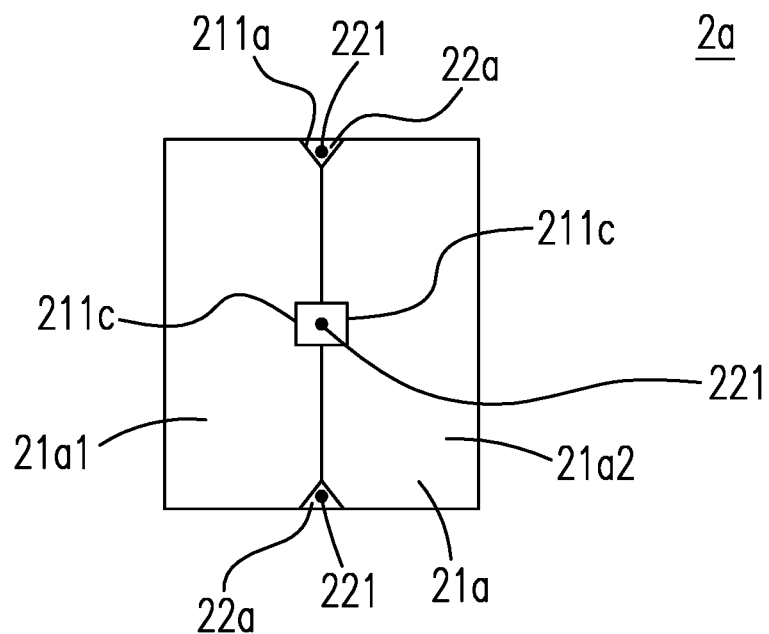
FIG. 12(a) is a schematic diagram of a smart mobile device according to the seventh preferred embodiment of the present invention showing when both of two nonadjacent shorter sides of a rectangular-shaped foldable screen have a notch, each of four corners of a front has a cut edge, and the two nonadjacent shorter sides are folded from the front to a back thereof for 180°, a first lens to a third lens are revealed.

FIG. 9(a) shows a schematic diagram of a front of a smart mobile device according to the third preferred embodiment of the present invention. In FIG. 9(a), the smart mobile device 2a (see FIG. 12(a)) is a rectangular foldable mobile device 2a having a rectangle 21, each of four corners 210 of the rectangle 21 has a small cut edge 211a, the foldable mobile device 2a includes a first front 21a, which is an all screen 21a, the small cut edge 211a is flat, and the rectangle 21 has four sides 211. As shown in FIG. 9(a), it is an embodiment excluding the small notch 211c of the two left-hand side and the right-hand side shorter edges 211 of the rectangle 21 as shown in FIG. 12(a).

Figure 9B:
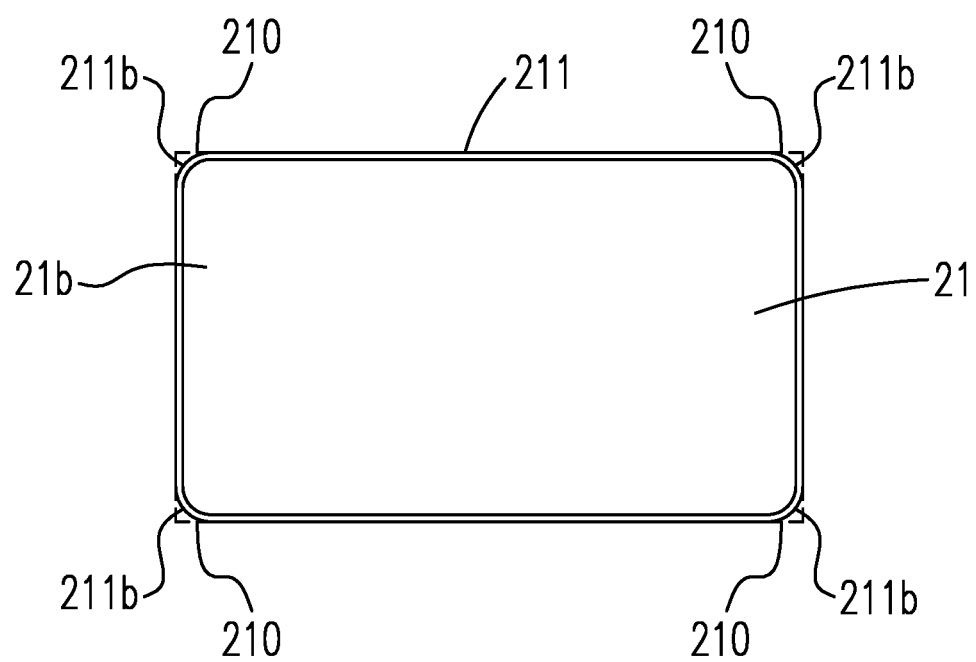
FIG. 9(b) is a schematic diagram of a front of a smart mobile device according to the fourth preferred embodiment of the present invention.
Figure 12B:
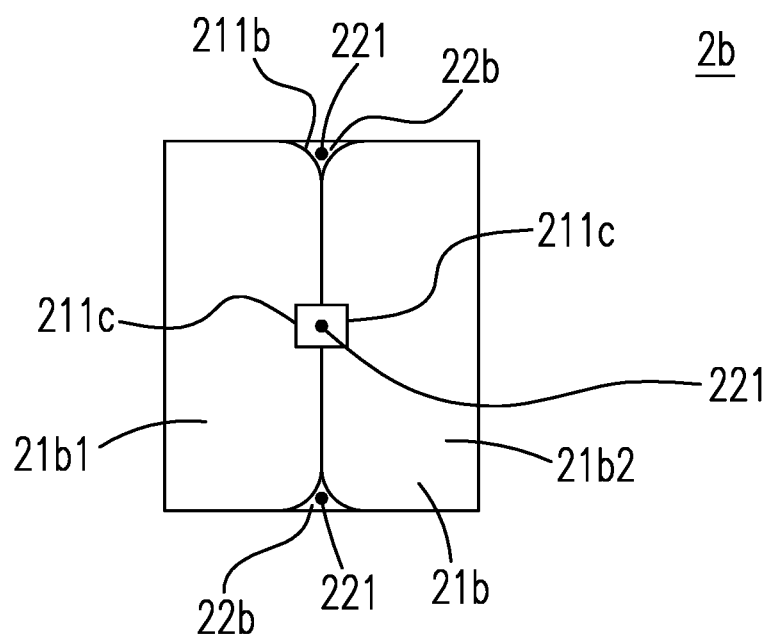
FIG. 12(b) is a schematic diagram of a smart mobile device according to the eighth preferred embodiment of the present invention showing when both of two nonadjacent shorter sides of a rectangular-shaped foldable screen have a notch, each of four corners of a front has a cut edge, and the two nonadjacent shorter sides are folded from the front to a back thereof for 180°, a first lens to a third lens are revealed.

FIG. 9(b) is a schematic diagram of a front of a smart mobile device according to the fourth preferred embodiment of the present invention. In FIG. 9(b), the smart mobile device 2b (see FIG. 12(b)) is a rectangular foldable mobile device 2b having a rectangle 21, each of four corners 210 of the rectangle 21 has a small cut edge 211b, the foldable mobile device 2b includes a first front 21b, which is an all screen 21b, the small cut edge 211b is rounded, and the rectangle 21 has four sides 211. As shown in FIG. 9(b), it is an embodiment excluding the small notch 211c of the two left-hand side and the right-hand side shorter edges 211 of the rectangle 21 as shown in FIG. 12(b). As shown in FIGS. 9(a) and 9(b), the smart mobile devices 2a/2b are foldable-all-screen smart mobile devices 2a/2b, the all screens 21a/21b are used as tablet devices 2a/2b, the smart mobile devices 2a/2b are used as rigid foldable mobile devices 2a/2b or flexible foldable mobile devices 2a/2b. The foldable screen 21a/21b has a surrounding perimeter (e.g., four sides 211 of the rectangle as shown in FIGS. 9(a) to 9(b)) form the surrounding perimeter), and the surrounding perimeter has at least one cut area 211a/211b/211c such that when the foldable screen 21a/21b is folded in a specific way, the at least one lens 221 is revealed from the at least one cut area 211a/211b/211c or surrounded by a plurality of the cut areas 211a/211b/211c.

Figure 10A:
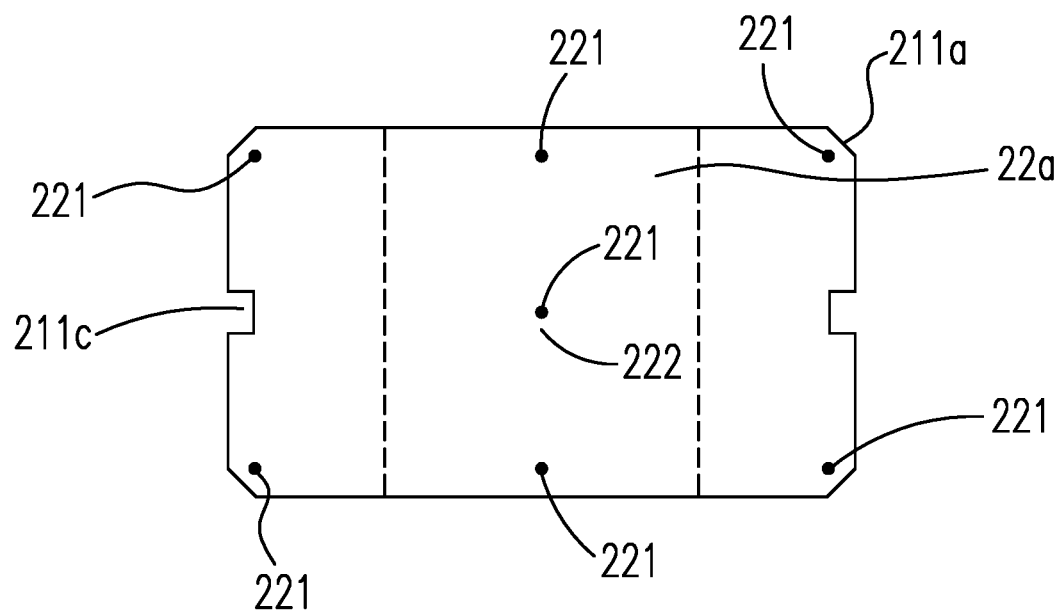
FIG. 10(a) is a schematic diagram of a back of a smart mobile device according to the fifth preferred embodiment of the present invention.

FIG. 10(a) shows a schematic diagram of aback of a smart mobile device according to the fifth preferred embodiment of the present invention. Because most areas on the back are not revealed after the folding, thus the physical configuration being practical but not beautiful such as card slot, volume/power buttons, upright auxiliary frame and so on can be installed on the back. In FIG. 10(a), it shows the back 22a of the smart mobile device 2a as shown in FIG. 12(a). In FIG. 10(a), except for showing the four corners 210 (see FIG. 9(a)) of the rectangle 21, each of which has a small cut edge 211a, it also shows that the small notch 211c (it is a rectangular notch and can be a triangular notch too) of the left-hand side and the right-hand side shorter sides 211 (see FIG. 9(a)), and the back 22a has lenses 221 (the first to the seventh lenses sequentially) respectively configured thereon a middle of each of the two longer sides 211 (see FIG. 9(a)), a center 222 of the back 22a and four places respectively near to the four cut edges 211a.

Figure 10B:
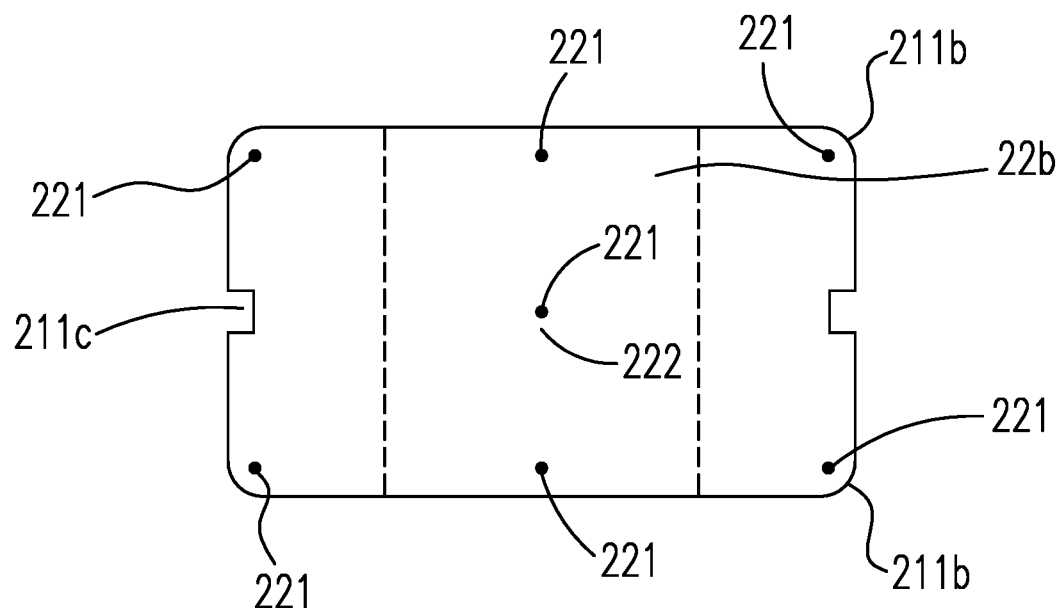
FIG. 10(b) is a schematic diagram of a back of a smart mobile device according to the sixth preferred embodiment of the present invention.

FIG. 10(b) shows a schematic diagram of a back of a smart mobile device according to the sixth preferred embodiment of the present invention. In FIG. 10(b), it shows the back 22b of the smart mobile device 2b as shown in FIG. 12(b). In FIG. 10(b), except for showing the four corners 210 (see FIG. 9(b)) of the rectangle 21, each of which has a small cut edge 211b, it also shows that the small notch 211c (it is a rectangular notch and can be a triangular notch too) of the left-hand side and the right-hand side shorter sides 211 (see FIG. 9(b)), and the back 22b has lenses 221 (the first to the seventh lenses sequentially) respectively configured thereon a middle of each of the two longer sides 211 (see FIG. 9(b)), a center 222 of the back 22b and four places respectively near to the four cut edges 211b. In FIG. 10(a) or FIG. 10(b), if the left side (referring to 21d1 of FIG. 13(a)) and the right side (referring to 21d2 of FIG. 13(a)) are gathered up, the first lens to the third lens 221 are revealed, and the first lens to the third lens 221 are all used as front lens 221 (see FIG. 12(a) or FIG. 12(b)). In FIG. 10(a) or FIG. 10(b), the small notch 211c of the left-hand side and the right-hand side shorter sides 211 (see FIG. 9(a) or FIG. 9(b)) of the rectangle 21 and the lens 221 located at the center 222 are options.

Figure 11A:
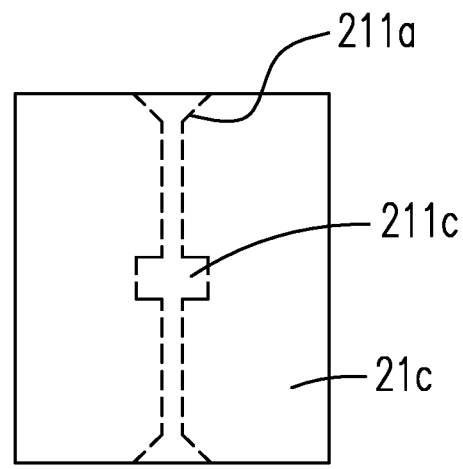
FIG. 11(a) is a schematic diagram of a smart mobile device according to the fifth preferred embodiment of the present invention showing when a left side including two adjacent corners and a right side including another two adjacent corners of a rectangular-shaped foldable screen are folded to a back thereof for 180°, a first front of the rectangular-shaped foldable screen is shrunk to a second front.
Figure 11B:
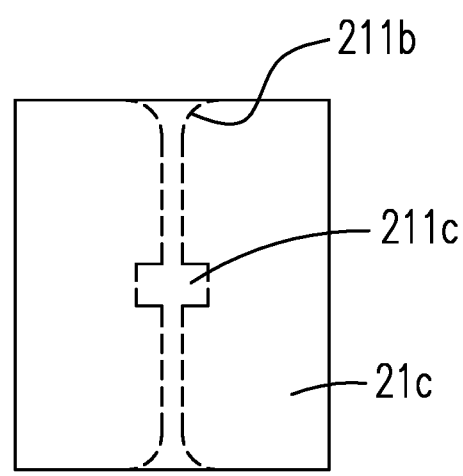
FIG. 11(b) is a schematic diagram of a smart mobile device according to the sixth preferred embodiment of the present invention showing when a left side including two adjacent corners and a right side including another two adjacent corners of a rectangular-shaped foldable screen are folded to a back thereof for 180°, a first front of the rectangular-shaped foldable screen is shrunk to a second front.

FIGS. 11(a) and 11(b) respectively display a schematic diagram of a smart mobile device according to the fifth and the sixth preferred embodiments of the present invention showing when a left side including two adjacent corners and a right side including another two adjacent corners of a rectangular-shaped foldable screen are folded to a back thereof for 180°, a first front of the rectangular-shaped foldable screen is shrunk to a second front. The folded front as shown in FIG. 11(a) is a full version all screen, it is easy to be stored or to be taken, and it can be used as handheld communication equipment. Certainly, the second front 21c as shown in FIG. 11(a) or FIG. 11(b) can also be used to show the second front 21c when the rectangle 21 includes left-hand side with two adjacent corners 210 (see FIGS. 9(a) and 21d1 of FIG. 13(a)) and right-hand side including another two adjacent corners 210 (see FIGS. 9(a) and 21d2 of FIG. 13(a)) of the smart mobile device 2a/2b as shown in FIG. 9(a) or FIG. 9(b), and FIG. 12(a) or FIG. 12(b) are folded from the front 21a/21b to the back 22a/22b for 180° and gathered up. The area of the second front 21c is ½ of that of the first front 21a/21b. The all screen 21a/21b changes to double-sided display, and reveals the at least one lens 221 among the four small cut edges 211a/211b and/or reveal from the at least one notch 211c, which is used as a front lens 221.

FIG. 12(a) displays a schematic diagram of a smart mobile device according to the seventh preferred embodiment of the present invention showing when both of two nonadjacent shorter sides of a rectangular-shaped foldable screen have a notch 211c, each of four corners of a front has a cut edge 211a, and the two nonadjacent shorter sides are folded from the front to a back thereof for 180°, a first lens to a third lens are revealed. As shown in FIG. 12(a), the folded back includes two display areas (21a1+21a2) except for those places surrounded by cut edges 211a or notches 211c, and the two display areas are relatively large. The rear lens originally configured on the back can be used as a front lens due to the assistance of the display area, and it is quite convenient for the uses of taking selfies and taking front-ground in photography. The double-sided display can have a multi-screen monitoring function. The small cut edge 211a, under the precondition of almost having no influence to the visual effect, can create a maximum application value when it matches with various folding modes, and this is the maximum substantive feature of the present invention. FIG. 12(a) displays the rectangle 21 of the smart mobile device 2a having a left-hand side with two adjacent corners 210 (see FIGS. 9(a) and 21d1 of FIG. 13(a)) and a right-hand side including another two adjacent corners 210 (see FIGS. 9(a) and 21d2 of FIG. 13(a)). The left side and the right side are folded from the front 21a to the back 22a for 180° and gathered up to reveal the three lenses located at a middle of each of two longer sides 211 (see FIG. 9(a)) and the center 222 (see FIG. 10(a)).

FIG. 12(b) displays a schematic diagram of a smart mobile device according to the eighth preferred embodiment of the present invention showing when both of two nonadjacent shorter sides of a rectangular-shaped foldable screen have a notch 211c, each of four corners of a front has a cut edge 211b, and the two nonadjacent shorter sides are folded from the front to a back thereof for 180°, a first lens to a third lens are revealed. FIG. 12(b) displays the rectangle 21 of the smart mobile device 2b having a left-hand side with two adjacent corners 210 (see FIGS. 9(b) and 21d1 of FIG. 13(a)) and a right-hand side including another two adjacent corners 210 (see FIGS. 9(b) and 21d2 of FIG. 13(a)). The left side and the right side are folded from the front 21b to the back 22b for 180° and gathered up to reveal the three lenses located at a middle of each of two longer sides 211 (see FIG. 9(b)) and the center 222 (see FIG. 10(b)).

FIG. 13(a) shows a schematic diagram of a back of a smart mobile device according to the ninth preferred embodiment of the present invention, wherein each of four sides of a rectangular-shaped foldable screen has a notch, and each of four corners and a center of the back has a lens. FIG. 13(a) shows a back 22d of a smart mobile device 2d, the smart mobile device 2d is a foldable mobile device 2d (it is different from the smart mobile device 2a: a small notch 211c is located at a middle of each of longer and shorter sides of the rectangle 21 of the smart mobile device 2d, and the rectangle 21 of the smart mobile device 2a in FIG. 9(a) has a small cut edge 211a near each of the four corners 210) having a rectangle 21 (referring to FIG. 9(a)). Each of the four corners 210 (referring to FIG. 9(a)) and a center 222 of the back 22d are respectively configured thereon lenses 221. In addition, the back 22d further has a left-hand side 21d1 including two adjacent corners 210 (see FIG. 9(a)) and a right-hand side 21d2 including another two adjacent corners 210 (see FIG. 9(a)). In FIG. 13(a), if the left side 21d1 and the right side 21d2 are folded from the front 21a to the back 22d for 180° and gathered up, then four lenses 221 will be revealed from the two small cut edges 211c of the upside longer side 211 and the underside longer side 211 of the rectangle 21 and a fifth lens located at center 222 will be revealed from the two notches 211c of the left-hand side 21d1 and the right-hand side 21d2 respectively, and they are used as five front lenses 221.

FIG. 13(b) displays a schematic diagram of a smart mobile device as shown in FIG. 13(a) showing when two shorter sides of the rectangular-shaped foldable screen are folded to the back for 180°, a fifth lens is revealed from the center of the back, and a first to a fourth lenses are revealed from the front. As shown in FIG. 13(b), when the left-hand side 21d1 and the right-hand side 21d2 of the smart mobile device 2d as shown in FIG. 13(a) are folded from the first front 21d to the back 22d for 180°, except for the folded front 21d, the lens 221 surrounded by the two small notches 211c and located at the center 222 of the back 22d is revealed. In addition, the four lenses 221 near the four corners 210 of the rectangle 21 (see FIG. 9(b)) of the back 22d will be revealed, two of them from the small notch 211c located at a middle of the upside longer side 211 and two of them from the small notch 211c located at a middle of the underside longer side 211 of the rectangle 21. Due to that the small notch 211c of the upside longer side 211 (see FIG. 9(a) or FIG. 9(b)) and the small notch 211c of the underside longer side 211 (see FIG. 9(a) or FIG. 9(b)) are covered by the two corners 210 of the rectangle 21 at the same side of the revealed lens close to the center 222, and can be only observed from the same side of second front 21c' (see FIG. 13(c)), two lens 221 are revealed from the small notch 211c of the upside longer side 211 and two lens 221 are revealed from the small notch 211c of the underside longer side 211.

Thus, the two small notches 211c of the upside longer side 211 and the underside longer side 211, and the four lenses 221 shown in FIG. 13(b) are all indicated by dotted lines.

FIG. 13(c) displays a schematic diagram of a smart mobile device as shown in FIG. 13(a) showing when two shorter sides of the rectangular-shaped foldable screen are folded to the back for 180°, a first to a fourth lenses are revealed from the front. In FIG. 13(c), it shows when the left-hand side 21d1 and the right-hand side 21d2 of the smart mobile device 2d as shown in FIG. 13(a) are folded from the first front 21d to the back 22d for 180°, the folded first front 21d forms the second front 21c'. Meanwhile, the four lenses 221 near the four corners 210 of the rectangle 21 of the back 22d will be revealed, two of them from the small notch 211c located at a middle of the upside longer side 211 (see FIG. 9(a) or FIG. 9(b)) and two of them from the small notch 211c located at a middle of the underside longer side 211 (see FIG. 9(a) or FIG. 9(b)) of the rectangle 21.

According to the aforementioned descriptions, the present invention discloses a square-shaped or a rectangular-shaped foldable mobile device with a small notch and/or a small cut edge in at least one of four sides and/or four corners, the front is an all screen, a lens is configured on each of the four corners and the center of the back. When the four corners of the square are folded outward for 180°, or when a left side and a right side of the rectangle, each including two corners, are folded outward from the front to the back, the area is greatly reduced, and the all screen becomes a double-sided display. At least one lens will be revealed from at least one small notch/small cut edge so as to solve the problem of the hiding of the front lens of the all screen. The four corners can be gathered up for only a portion to assist the mobile device to stand up, or to provide the uses of a panorama, a multi-screen monitoring function and a virtual joystick, and a flash, a support and/or all kinds of other auxiliary function settings can be added to the back, thus the proposed smart mobile device has non-obviousness and novelty.

While the invention has been described in terms of what is presently considered to be the most practical and preferred embodiments, it is to be understood that the invention need not be limited to the disclosed embodiments. Therefore, it is intended to cover various modifications and similar configurations included within the spirit and scope of the appended claims, which are to be accorded with the broadest interpretation so as to encompass all such modifications and similar structures.

What is claimed is:

1. A smart mobile device, comprising:
   a square-shaped foldable screen having a first front, and a back with a center; and
   at least one lens configured on the center, wherein the square-shaped foldable screen has four corners, each corner has a cut edge or a notch, and when the four corners of the first front are all folded to the back for 180°, the at least one lens configured on the center is surrounded among the cut edges or the notches.

2. The smart mobile device according to claim 1, wherein the at least one lens configured on the center has a number of 4, each of which is located near each of the cut edges or the notches.

3. The smart mobile device according to claim 1, wherein the smart mobile device is a foldable-all-screen smart mobile device.

4. The smart mobile device according to claim 1, wherein the back has four fold lines forming a square region, when the four corners of the first front are all folded to the back along the respective fold lines for 180°, the first front left unfolded is shrunk to a second front, the at least one lens is surrounded among the four folded corners so as to take pictures, each cut edge is rounded or flat, the second front is square-shaped, and the area of the second front is ½ of that of the first front.

5. The smart mobile device according to claim 1, wherein the two corners of the first front nonadjacent and opposite to each other are folded to the back for 90°, the two folded and opposite corners are used as supports to help the smart mobile device to stand up, each of the two folded and opposite corners forms a lateral screen to support a multi-screen monitoring function, the smart mobile device is a square-shaped foldable smartphone and is used as a hand-held game console having virtual keys, and the virtual keys are configured on lateral sides of the two unfolded corners.

6. The smart mobile device according to claim 1, wherein when the four corners are all folded from the back to a front side for 90° and the back is used as a basis and is put on a plane, the four corners are perpendicular to the plane, and the four corners respectively have four lenses, which are each near to each notch or cut edge, and are engaged in a 360° panorama.

7. The smart mobile device according to claim 1, wherein when one or more of the four corners is/are respectively configured thereon one or more lenses, and folded from the back to a front side for 180°, the lens located near each notch or cut edge is turned to the front side for taking selfies.

8. A smart mobile device, comprising:
   a rectangular-shaped foldable screen having a first front and a back; and
   at least one lens configured on the back, wherein the rectangular-shaped foldable screen has four sides and four corners, at least one of the four sides has a notch and/or at least one of the four corners has a cut edge, the first front is an all screen, the four sides have two longer ones and two shorter ones, the rectangular-shaped foldable screen has a second front when the two shorter sides are folded from the first front to the back for 180°, the area of the second front is ½ of that of the first front, the second front has a rectangular shape and results in that the all screen becomes a double-sided display, and the at least one lens is near or surrounded by the respective cut edge and/or notch.

9. The smart mobile device according to claim 8, wherein the smart mobile device is a foldable-all-screen smart mobile device, the all screen is used as a tablet, when the notch is located at a middle of each of longer and shorter sides, and each of the four corners and a center of the back are respectively configured thereon lenses, after the two shorter sides are folded, four lenses of the four corners are revealed from the two notches of the two longer sides respectively, and a fifth lens configured on the center of the back is surrounded by the two notches of the two shorter sides.

10. The smart mobile device according to claim 8, wherein a first lens and a second lens are located at middles of the two longer sides on the back respectively, the four corners have two upper cut edges and two lower cut edges respectively, and if the two shorter sides are folded from the first front to the back for 180°, each of the first and the second lenses is revealed between the two upper cut edges and between the two lower cut edges respectively.

11. The smart mobile device according to claim 10, wherein the back has a middle with a third lens configured thereon, each shorter side has a middle with a notch, and if the two shorter sides are folded from the first front to the back for 180°, the third lens is revealed from the two notches of the two shorter sides.

12. A smart mobile device, comprising:
a foldable screen having a front and a back; and
at least one lens configured on the back, wherein:
the foldable screen has a surrounding perimeter; and
the surrounding perimeter has at least one cut area such that when the foldable screen is folded in a specific way, the at least one lens is revealed from the at least one cut area or surrounded by a plurality of the cut areas.

13. The smart mobile device according to claim 12, wherein the cut area is a notch or a cut edge.

14. The smart mobile device according to claim 12, wherein the foldable screen is a square-shaped foldable screen or a rectangular-shaped foldable screen.

15. The smart mobile device according to claim 14, wherein when the foldable screen is a square-shaped foldable screen, the front is a first front, the back has a center, the surrounding perimeter further includes four corners, each corner has the cut area including a cut edge or a notch, the at least one lens is configured on the center, and when the four corners are all folded from the first front to the back for 180°, the at least one lens configured on the center is surrounded among the cut edges or the notches.

16. The smart mobile device according to claim 14, wherein when the foldable screen is a rectangular-shaped foldable screen, the front is a first front, the back has a center, the surrounding perimeter includes four sides having two longer ones, two shorter ones and four corners, at least one of the four sides has the cut area including a notch and/or at least one of the four corners has the cut area including a cut edge, the first front is an all screen, the at least one lens is configured on the center and/or near the respective cut edge or notch, the rectangular-shaped foldable screen has a second front when the two shorter sides are folded from the first front to the back for 180°, the area of the second front is ½ of that of the first front, the second front has a rectangular shape and results in that the all screen becomes a double-sided display, and the at least one lens is surrounded by or revealed from the respective cut edges and/or notches.

* * * * *